(12) United States Patent
Sousa et al.

(10) Patent No.: US 11,380,033 B2
(45) Date of Patent: Jul. 5, 2022

(54) TEXT PLACEMENT WITHIN IMAGES USING NEURAL NETWORKS

(71) Applicant: Adobe Inc., San Jose, CA (US)

(72) Inventors: Kate Sousa, San Francisco, CA (US); Zhe Lin, Fremont, CA (US); Saeid Motiian, San Francisco, CA (US); Pramod Srinivasan, Sunnyvale, CA (US); Baldo Faieta, San Jose, CA (US); Alex Filipkowski, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 15 days.

(21) Appl. No.: 16/738,359

(22) Filed: Jan. 9, 2020

(65) Prior Publication Data

US 2021/0217215 A1 Jul. 15, 2021

(51) Int. Cl.
| | |
|---|---|
| *G06T 11/60* | (2006.01) |
| *G06K 9/62* | (2022.01) |
| *G06N 3/04* | (2006.01) |
| *G06N 3/08* | (2006.01) |
| *G06V 10/25* | (2022.01) |

(52) U.S. Cl.
CPC ............ *G06T 11/60* (2013.01); *G06K 9/6256* (2013.01); *G06N 3/04* (2013.01); *G06N 3/08* (2013.01); *G06V 10/25* (2022.01); *G06T 2210/12* (2013.01)

(58) Field of Classification Search
CPC ........... G06K 2209/01; G06K 9/00456; G06K 9/00463; G06K 9/2054; G06K 9/3258; G06K 9/325; G06K 9/4628; G06K 9/6274; G06K 9/6256; G06T 3/4046; G06T 5/009; G06N 3/0454; G06N 3/08; G06N 3/04

See application file for complete search history.

(56) References Cited

U.S. PATENT DOCUMENTS

| | | | |
|---|---|---|---|
| 2006/0109510 A1* | 5/2006 | Widwowson | G06F 40/103 358/1.18 |
| 2014/0026038 A1* | 1/2014 | Lee | G11B 27/34 715/244 |
| 2014/0198127 A1* | 7/2014 | Ying | G06K 9/00442 345/600 |
| 2016/0350930 A1* | 12/2016 | Lin | G06K 9/66 |
| 2017/0032554 A1* | 2/2017 | O'Donovan | G06F 3/0488 |
| 2019/0019020 A1* | 1/2019 | Flament | G06N 3/08 |
| 2019/0019052 A1* | 1/2019 | Pao | G06K 9/3258 |

(Continued)

OTHER PUBLICATIONS

Apple Developer, "Cropping Images Using Saliency", retrieved from https://developer.apple.com/documentation/vision/cropping_images_using_saliency, downloaded on Jan. 9, 2020, 4 pages.

(Continued)

*Primary Examiner* — Jin Cheng Wang
(74) *Attorney, Agent, or Firm* — F. Chau & Associates, LLC

(57) ABSTRACT

Based on a received digital image and text, a neural network trained to identify candidate text placement areas within images may be used to generate a mask for the digital image that includes a candidate text placement area. A bounding box for the digital image may be defined for the text and based on the candidate text placement area, and the text may be superimposed onto the digital image within the bounding box.

20 Claims, 7 Drawing Sheets

(56) References Cited

U.S. PATENT DOCUMENTS

| | | | |
|---|---|---|---|
| 2019/0114743 A1* | 4/2019 | Lund | G06N 3/0454 |
| 2019/0272438 A1* | 9/2019 | Liu | G06N 3/04 |
| 2019/0332861 A1* | 10/2019 | Biswas | G06F 40/106 |
| 2020/0242774 A1* | 7/2020 | Park | G06N 20/10 |
| 2021/0124995 A1* | 4/2021 | Mas Montserrat | G06K 9/6254 |

OTHER PUBLICATIONS

Adobe Inc., "Using the Adobe Stock website", retrieved from https://helpx.adobe.com/stock/help/using-adobe-stock-website.html, Apr. 3, 2019, 15 pages.

* cited by examiner

TEXT PLACEMENT WITHIN IMAGES USING NEURAL NETWORKS

TECHNICAL FIELD

This description relates to text placement within images using neural networks.

BACKGROUND

Images are often used to obtain a desired effect, such as to convey a message, promote an idea, or evoke an emotional response. Text is often placed within images to amplify or leverage such effects. For example, in the context of advertising, a caption, subtitle, slogan, or other content may be superimposed onto, or otherwise included within, an image.

Such text, however, cannot be placed randomly within images. For example, placing text over critical image content, such as a face, will not only obscure the covered content, but will likely diminish, rather than enhance, the overall desired effect of the image. More generally, even if critical content is not obscured, both images and text may have such a wide range of possible formats and content, that even achieving aesthetically pleasing text placement is challenging.

SUMMARY

According to one general aspect, a computer program product may be tangibly embodied on a non-transitory computer-readable storage medium and may include instructions. When executed by at least one computing device, the instructions may be configured to cause the at least one computing device to receive a digital image and text, and generate a mask for the digital image using a neural network trained to identify candidate text placement areas within images, where the mask includes at least one candidate text placement area. The instructions, when executed, may be further configured to cause the at least one computing device to define a bounding box with respect to the digital image, based on the text and on the at least one candidate text placement area, and superimpose the text onto the digital image within the bounding box.

According to another general aspect, a computer-implemented method may include receiving a digital image and text, and generating a mask for the digital image using a neural network trained to identify candidate text placement areas within images, the mask including at least one candidate text placement area. The method may include defining a bounding box with respect to the digital image, based on the text and on the at least one candidate text placement area, and superimposing the text onto the digital image within the bounding box.

According to another general aspect, a system may include at least one memory including instructions, and at least one processor that is operably coupled to the at least one memory. The at least one processor may be arranged and configured to execute instructions that, when executed, cause the at least one processor to receive a digital image and text, and process the digital image and text with a neural network trained using training data that includes training images and training text superimposed on the training images based on text placement heuristics, to thereby obtain a heatmap for the digital image. The instructions, when executed, may be further configured to define a bounding box, based on the heatmap, and superimpose the text onto the digital image and within the bounding box.

The details of one or more implementations are set forth in the accompanying drawings and the description below. Other features will be apparent from the description and drawings, and from the claims.

DETAILED DESCRIPTION

Figure 1:
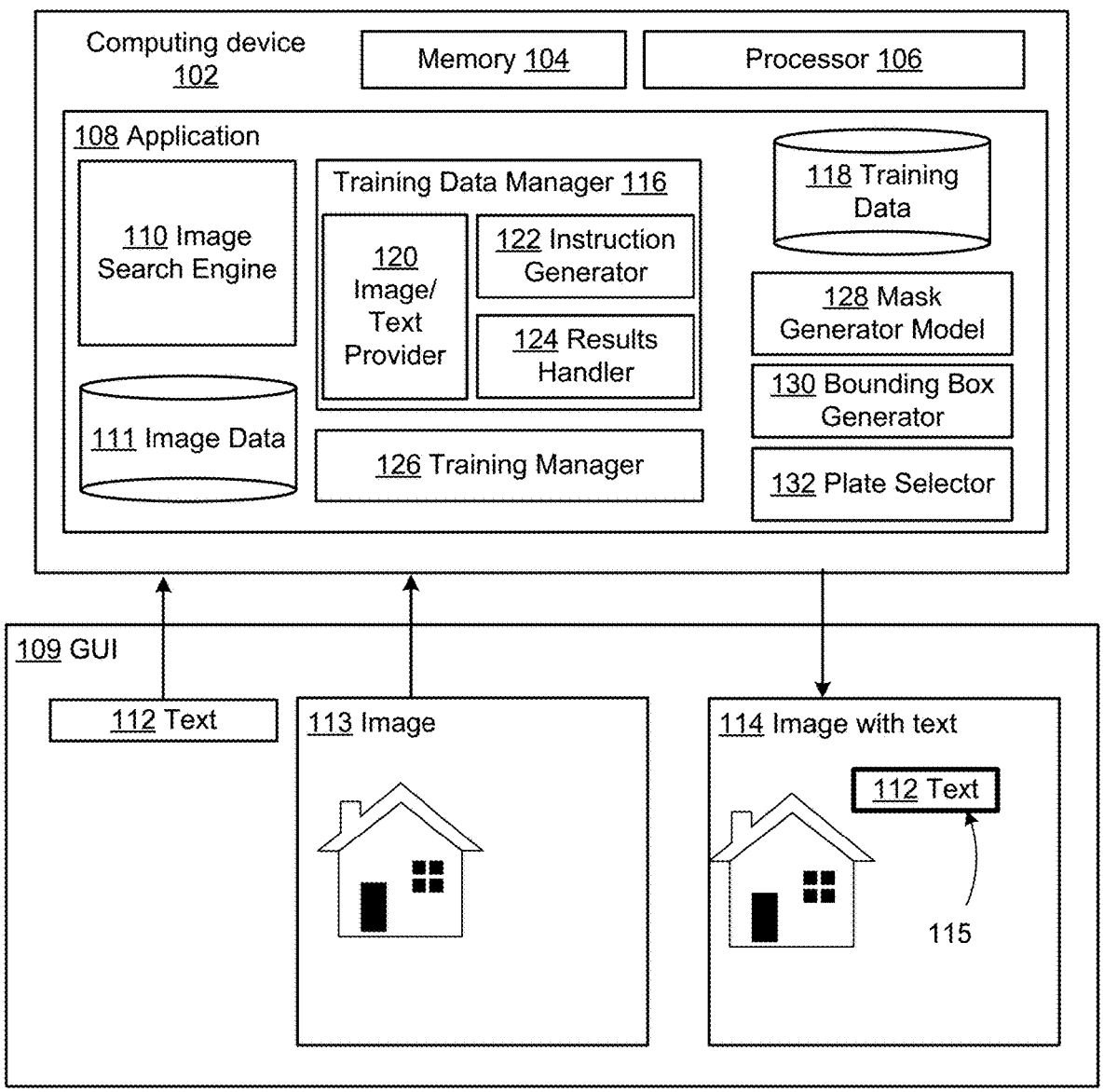
FIG. 1 is a block diagram of a system for text placement within images using neural networks.

This document describes systems and techniques that provide for text placement within images using neural networks. The described text placement techniques provide for the new computer functionality of, e.g., training one or more neural networks to select an image portion of an image in which to insert specified text, even when the image content and/or formatting has not previously been input to the neural networks, and even when the text is of arbitrary length and/or formatting.

For example, the described techniques may collect training data that includes human-labelled images with text, where the text was placed within the images according to a set of rules, but in accordance with human judgement as to how to implement those rules. By training subsequent neural networks in accordance with such training data, the described techniques obtain results that are aesthetically similar to the training data, even when the images and text being processed are different from the images and text used in the training data. Put another way, the described techniques effectively enable implementation of neural networks capable of labelling images in accordance with the rules originally assigned to the human labellers, and with results resembling the use of human judgement.

The described techniques are able to accomplish these and related results, even with a relatively small number of parameters being required for the neural networks being implemented. For example, when human-labelled training data is used, it may be relatively difficult, expensive, or time-consuming to obtain training data. As a result, it may be difficult to sufficiently parameterize a neural network model(s) to obtain desired results.

The described techniques, however, obtain desired image labelling results without requiring a relatively large number of parameters. Moreover, the described techniques may utilize processing techniques that enable the desired results while using less memory and/or processing resources, as referenced above. For example, as described below with respect to the feature map generators of FIGS. 4, 5, and 17, the described techniques may provide desired results while using relatively low-resolution feature maps, and/or by leveraging existing (already-trained) feature map generators.

The described techniques may be used to receive an image and generate a mask that defines a candidate text placement area(s) within the image. For example, the mask may be generated as a heatmap that is black in all areas other than the candidate text placement area(s), and with the candidate text placement area(s) being white.

A bounding box generator may receive text to be placed within the image, and identify a bounding box within the candidate text placement area(s), based on the size and formatting of the text. In this way, the text may be placed within (e.g., superimposed on) the image within an area of the image corresponding to the bounding box. As referenced above, the net effect is that the labelled image has the text placed therein in a manner that is in accordance with the original rules for image labelling that were provided to the human labellers providing the training data.

In conventional text-placement scenarios, it may be common for human users to identify substantially uniform (non-variable) background areas of the image that correspond generally in size and/or color to text to be superimposed onto the image. For example, an image may include an area of sky, or grass, or of a wall, in which text may be placed. However, in many images, such background areas may be small or otherwise poorly-sized for text to be entered. In many cases, images may not include any entirely suitable, non-variable areas.

In these and similar cases, the described techniques are capable of making a best-available determination for text placement, according to original heuristics provided to the human labellers. For example, the described techniques may prioritize avoidance of any text being placed over a face within an image, or over other important image content.

In some such cases, when image content is so variable as to prevent legible or aesthetically-pleasing placement of text therein, the described techniques may determine a need to generate uniform text background fill, referred to herein as a plate, or contrast plate. For example, such a plate may be placed within a best-available area of an image for text to be included, and a color of the plate may be determined in a manner that results in legible, aesthetically-pleasing inclusion of the text in question.

The described techniques may be particularly useful in scenarios utilizing large-scale image databases. For example, an image database may contain millions of images having different types of content, and a user of the image database may wish to search for a suitable or desired image to use in conjunction with text to be included therein. Using the described techniques, the user may simply execute image searches for desired image content, in conjunction with the text to be included. In this way, for example, the user may receive only images that will be compatible with the text to be included. Moreover, the user may immediately be provided with automatically-generated examples of resulting labelled images, without being required to manipulate either the image or the text.

Thus, the systems and techniques described herein advantageously improve existing technology areas. For example, as described, computer-based image searching is improved. Further, the systems and techniques may be used for a more automated and more efficient and faster approach to labelling images with desired text.

FIG. 1 is a block diagram of a system 100 for text placement within images using neural networks. The system 100 includes a computing device 102 having at least one memory 104, at least one processor 106, and at least one application 108. The computing device 102 may communicate with one or more other computing devices over a network. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform various functions over a network. In many of the following examples, the computing device 102 is described as, or may be understood to represent, a server.

The at least one processor 106 may represent two or more processors on the computing device 102 executing in parallel, and utilizing corresponding instructions stored using the at least one memory 104. The at least one memory 104 represents at least one non-transitory computer-readable storage medium. Thus, similarly, the at least one memory 104 may represent one or more different types of memory utilized by the computing device 102. In addition to storing instructions, which allow the at least one processor 106 to implement the application 108 and its various components, the at least one memory 104 may be used to store data.

The application 108 may be accessed directly by a user of the computing device 102, at the computing device 102. In other implementations, the application 108 may be running on the computing device 102 as a component of a cloud network where a user accesses the application 108 from another computing device over a network. In one implementation, the application 108 may be, or include, an image search application. In other implementations, the application 108 may be a stand-alone application that is designed to work with an image search application (which may be running, e.g., on a user device connected with the computing device 102). The application 108 also may be a standalone application that is used to search a plurality of images created by an image search application(s). In still other alternatives, the application 108 may be an application that runs, at least partially, in another application, such as a browser application. Of course, the application 108 may be a combination of any of the above examples, as well.

In the example of FIG. 1, the application 108 is illustrated as being in communication with a graphical user interface (GUI) 109. As referenced herein, the GUI 109 may be part of the application 108, and/or may represent a stand-alone browser.

The application 108 includes an image search engine 110, as well as a database 111 of image data. The image data 111 may include a large number, including millions or more, available images, which may be referred to as 'stock images.' Such stock images are known to be useful in many different fields. For example, graphic designers may use the image search engine 110 to identify a desired image, or type of image, from the image data 111, for use in marketing efforts. Other potential users may include students, artists, business users generating internal or external reports, or any persons interested in using images to convey an a message or an idea.

For example, in various implementations, the image search engine 110 may enable image or topic-based searching. For example, a user may utilize the GUI 109 to submit images to the image search engine 110, which may then analyze the submitted images to search for similar images within the image data 111. The user may submit a word or phrase that the image search engine 110 may similarly use to identify an image, or type of image. In some cases, the image data 111 may be associate image metadata with the various stock images, to facilitate searching by the image search engine 110.

Thus, for example, a user may search for stock images of "a boy and his dog," or "two people working together," or any desired topic, including submitting example images of such topics to the image search engine 110 for use in searching the image data 111. As the image data 111 may include millions of stock images, the user may potentially receive a large number of images as search results, which may vary widely in terms of how the searched-for topic is represented therein.

In the example of FIG. 1, text 112 represents text that a user wishes to include with (e.g., superimpose onto) a particular image 113. In the simplified example of FIG. 1, the image 113 may represent any image, from any source, that the user wishes to submit to the application 108. In more specific examples, however, it may occur that the image 113 is selected from the image data 111. For example, the image 113 may be obtained from the image data 111 as part of a search conducted by the image search engine 110, as just referenced.

For example, the user may select the image 113 as an individual image from among a plurality of images returned by the image search engine 110. In other examples, the image 113 may represent a number of images obtained from the image data 111, all of which may be processed by the application 108. In particular, as described below, it may occur that the image 113 represents a number of images that are processed by the application 108 with respect to placement of the text 112, before the image 113 is even shown to the user. In such embodiments, the user may be provided with image search and text placement results together, so that the user may select a desired result.

Regardless of how the image 113 is obtained and/or submitted, FIG. 1 illustrates that the application 108 is configured to receive the text 112 and the image 113, and to output an image with text 114. That is, as shown, the application 108 may determine that the illustrated location of the image 113 at which the text 112 is placed is the best-available location within the image 113.

Further in the example, and as described in detail, herein, it may occur that the text 112 is placed within a plate 115. In FIG. 1, the plate 115 is illustrated as a bolded rectangle, but as described below, the plate 115 generally represents any discrete text background onto which the text 112 may be placed in conjunction with superimposing both the plate 115 and the text 112 onto the image with text 114. Although not explicitly illustrated in the simplified, black-and-white example of FIG. 1, such a plate may be included when the image 113 does not include any area that is suitably uniform and/or colored to include the text 112 in a legible or otherwise suitable (e.g., aesthetically-pleasing) manner.

In order to obtain the result of the image with text 114, and similar results, the application 108 may include a training data manager 116, which is configured to facilitate the collection of suitable training data 118. As referenced, the training data 118 may include training images and training text superimposed on the training images based on the types of text placement heuristics referenced herein.

For example, as referenced above, the training data manager 116 may include an image/text provider 120 that is configured to provide human labelers with a plurality of images and corresponding text (e.g., a plurality of captions, slogans, or other labels).

An instruction generator 122 may generate instructions to the human labelers, which instruct the human labelers in the desired manners in which the text examples should be placed within the corresponding image(s). Then, a results handler 124 may be configured to receive the results (e.g., labeled images) within the training data 118.

In specific examples, the image/text provider 120 may utilize diverse examples of images to label. For example, images may be obtained from the image data 111, or any suitable source (e.g., selected randomly, or selected based on inclusion in previous search results of the image search engine 110).

The instruction generator 122 may be configured to provide one or more labeling strategies which instruct the human users in determining what constitutes preferred text placement. Considerations include characterizations of different types of images, the providing of example labelled images, and the providing of heuristics to be used by the human labelers.

In specific, non-limiting examples, rules provided by the instruction generator 122 may include "place a box on each image for each text label, with best-available size and position," "place only one box per image," "disregard any meaning of the text and focus on where the text would look best in the particular image," "if no suitable contrast color exists in the image, add a plate behind the text," "always place the text, even if no perfect place exists within the image," "text can never be placed on people's clear faces," "text boxes never go to the image edge, and must leave at least some space from the edge," and "for text phrases with 2-5 words, consider using 1, 2, or 3 rows." As referenced, the preceding instructions are mere examples, and many other types of instructions may be used.

A single training image may have multiple types and formats of text superimposed thereon. For example, different text examples may include text with one, two, or more words or phrases, perhaps with differing formats. For example, longer phrases of text may benefit from being formatted for multiple lines of text.

The results handler 124 may be configured to receive the resulting, labeled images. The results handler 124 may be configured to judge or measure a convergence of the results, or other factors for quantifying a success, and thus completion, of the labeling task. For example, the results handler 124 may be configured to filter labeled images that do not comply with one or more of the above rules, if measurable (e.g., may filter images with labels on faces, or adjacent to an image edge). In other examples, the results handler 124 may measure similarities of outcomes for a same or similar image/text pair, as labeled by multiple human labelers.

Once the training data 118 is assembled, a training manager 126 may be configured to train a mask generator model 128, using the training data 118. As described in detail, below, with respect to FIGS. 2A-2C, and FIGS. 4-6, the mask generator model 128 may be trained to receive an image, such as the image 113, and generate a mask that indicates candidate text placement areas.

A bounding box generator 130 may be configured to receive text, such as the text 112, and generate a bounding box using the mask and the text 112. In some described implementations, the bounding box generator 130 may be implemented as using a scoring algorithm to calculate a best-available score for a suitable bounding box. Additionally, or alternatively, the bounding box generator 130 may be partially or completely implemented as a neural network that is also trained by the training manager 126, in this case to select a best-available bounding box for the specified text/image combination.

Finally in FIG. 1, as referenced above and described in more detail, below, e.g., with respect to FIG. 2A and FIG. 7, a plate selector 132 may be configured to determine whether to include a plate, such as the plate 115, when superimposing the text 112. For example, the plate selector 132 may be trained to utilize a feature map used by the mask generator 128, together with a bounding box generated by the bounding box generator 130, to determine whether the plate 115 is necessary, and to determine characteristics of the plate, if needed.

Figure 2:
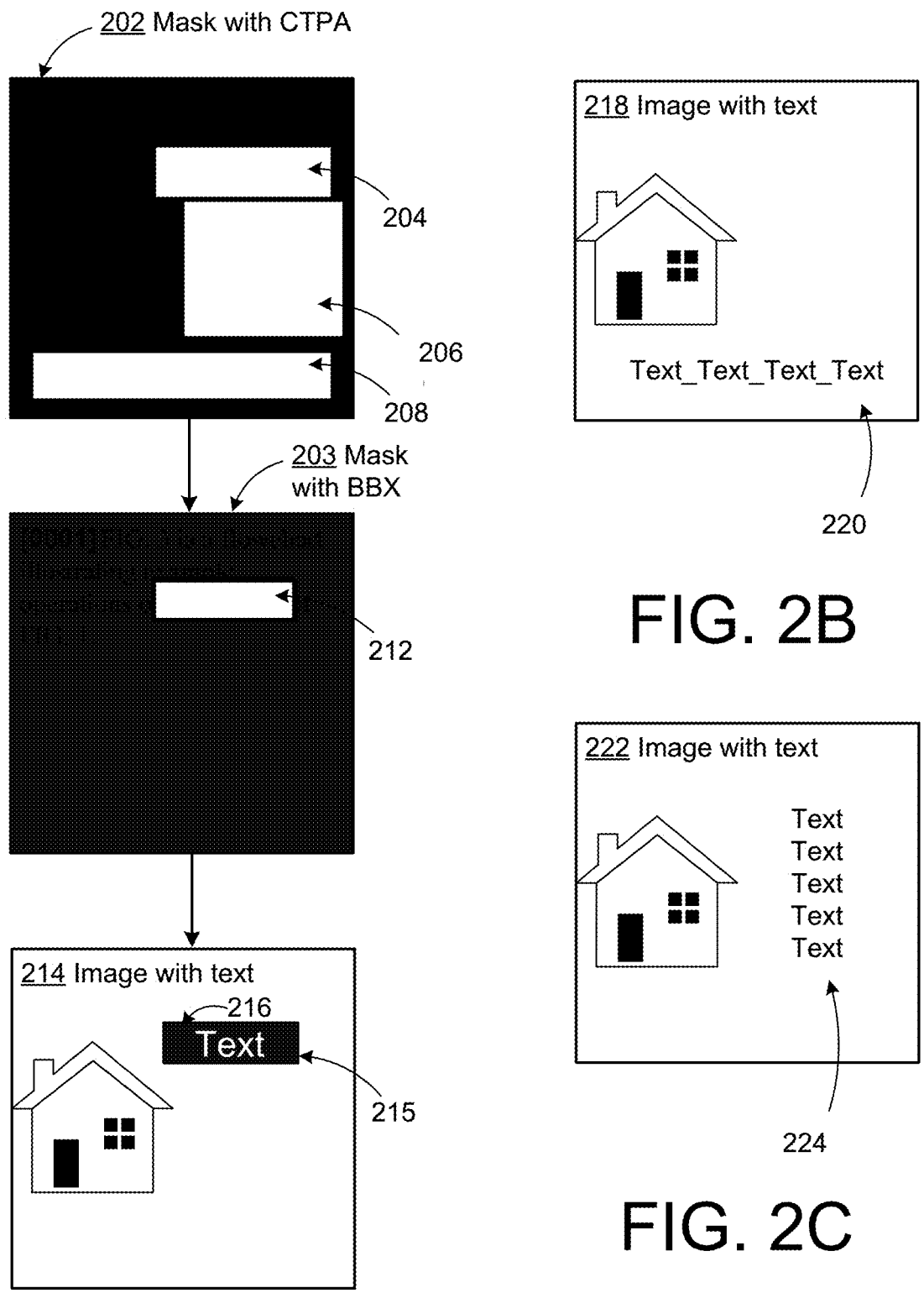
FIG. 2A illustrates a series of image processing operations in accordance with FIG. 1.
FIG. 2B illustrates an alternative result of the image processing operations of FIG. 2A, in accordance with FIG. 1.
FIG. 2C illustrates another alternative result of the image processing operations of FIG. 2A, in accordance with FIG. 1.

FIG. 2A illustrates a first example process flow of the mask generator model 128 and the bounding box generator 130, with respect to the example text 112 and image 113 of FIG. 1. Specifically, FIG. 2A illustrates that the mask generator model 128 outputs a mask 202 with candidate text placement areas (CTPA), illustrated as areas 204, 206, 208, which are generally corresponding to heuristics defining image locations that are preferred for text inclusion.

As described in detail below, e.g., with respect to FIG. 4, the mask generator model 128 is trained (e.g., parameterized) to input the image 113 and output the mask 202. The mask 202 is the same size as the image 113, and has a pixel value assigned to each mask pixel in accordance with the training executed by the training manager 126, as described above.

For example, when training results indicate that a given pixel of the image 113 is definitely not in a candidate area for text placement (such as a pixel of the illustrated house in the image 113, or a pixel within a person's face, or other unsuitable text placement area), the corresponding pixel value may be assigned a value of 0 (black). Conversely, a pixel in an area that is suitable for text placement, such as a uniform area at least slightly away from an image edge and not including image content that should remain uncovered, may be assigned a pixel value of 1 (e.g., white).

In the simplified example of FIG. 2A, the mask 202 includes areas 204, 206, 208 that are all white, while a remainder of the mask 202 is all black. In practice, as illustrated and described below with respect to FIG. 6, the mask generator model 128 may assign pixel values between 0 and 1 to areas of the mask 202 that are not definitely classified. As a result, for example, the areas 204, 206, 208 may have unclear or indistinct boundaries, and/or black portions of the mask 202 may include some pixels that are light or grey.

In the simplified example of FIG. 2A, the mask generator model 128 is not provided with the text 112. Rather, the mask generator model 128 simply classifies each pixel of the image 113 as just described, which results in identification of the CTPAs 204, 206, 208.

Then, the bounding box generator 130 may use the text 112 to define a best-available bounding box with respect to the provided CTPAs 204, 206, 208. For example, for the text 112 of FIG. 1, the bounding box generator 130 may define a bounding box have a width and height (w, h) that correspond to the size and formatting of the text 112, and may analyze placement of the defined bounding box with respect to the CTPAs 204, 206, 208.

In FIG. 2A, the result is mask 203 with bounding box (BBX) 212 placed as shown, within the CTPA 204. Techniques for generating and placing the bounding box 212 are described in more detail, below, e.g., with respect to FIG. 4. Also, although the bounding box 212 is illustrated with respect to the mask 203, it will be appreciated that since the mask 202 is the same size as the image 113, placement of the bounding box 212 at (x, y) coordinates of the mask 203 is tantamount to placement of the bounding box 212 at corresponding (x, y) coordinates of the image 113.

In some implementations, the bounding box 212 may initially be visible within the image 214. For example, this may facilitate potential user edits and adjustments, so that the bounding box may be removed upon acceptance of the inserted text by the user. In other example implementations, the bounding box 212 may be invisible to the user.

Finally in FIG. 2A, a resulting image 214 with text is illustrated. In the example, it is assumed that the bounding box 212, as just referenced, is placed within (or defined with respect to) the image 113, and that the text 112 is superimposed onto the image 113 within the defined bounding box 212. In FIG. 2A, the bounding box 212 is not separately illustrated within the image 214 with text. However, to illustrate example operations of the plate selector 132, it is assumed that the text 112 is colored white and the background image area of the CTPA 204 (and of the bounding box 212) is also white, so that a plate 215 is assigned to make inserted text 216 visible.

FIG. 2B illustrates an image 218 with text 220 to be inserted that includes more words than the original text 112. As a result, the bounding box generator 130 may determine a different best-available bounding box from the mask 202. For example, the bounding box generator 130 may assign a bounding box (not separately illustrated in FIG. 2B) corresponding to the CTPA 208.

Similarly, in FIG. 2C, an image 222 with text 224 illustrates again that the bounding box generator 130 is configured to determine and assign a best-available bounding box (not illustrated in FIG. 2C) for specific text to be inserted, and considering a length and formatting of the text to be inserted. As a result, in FIG. 2C, the bounding box generator 130 may identify a bounding box with respect to the CTPA 206.

Figure 3:
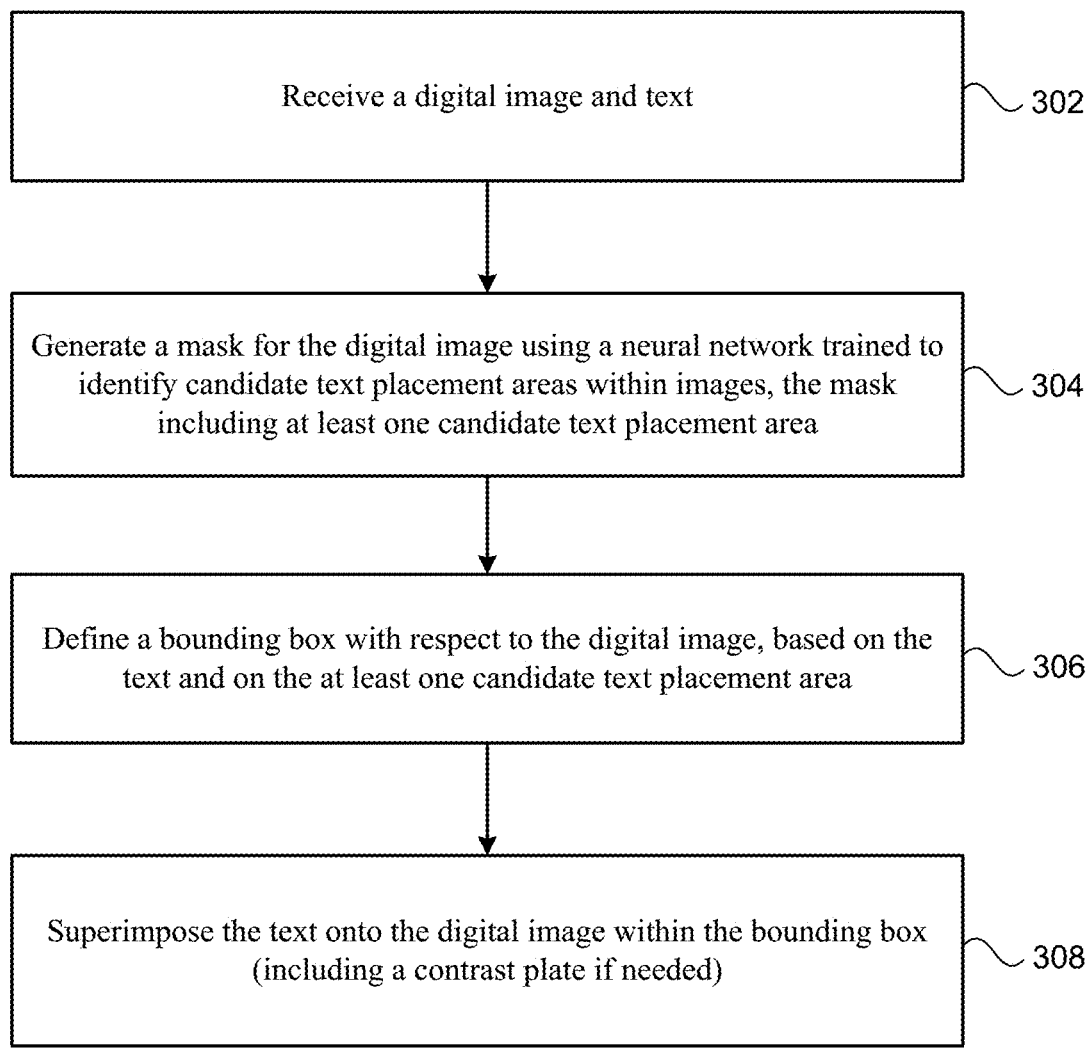
FIG. 3 is a flowchart illustrating example operations of the system of FIG. 1.

FIG. 3 is a flowchart 300 illustrating example operations of the system 100 of FIG. 1. In the example of FIG. 3, operations 302-308 are illustrated as separate, sequential operations. However, it will be appreciated that, in various implementations, additional or alternative operations or sub-operations may be included, and/or one or more operations or sub-operations may be omitted. Further, it may occur that any two or more of the operations or sub-operations may be executed in a partially or completely overlapping or parallel manner, or in a nested, iterative, looped, or branched fashion.

In the example of FIG. 3, a digital image and text may be received (302). For example, the mask generator model may receive the text 112 and the image 113. As described, the image 113 may be a single image received from a user, or may represent a plurality of images obtained as search results from the image data 111 by the image search engine 110.

A mask for the digital image may be generated using a neural network trained to identify candidate text placement areas within images, where the mask includes at least one candidate text placement area (CTPA) (304). For example, the mask generator model 128, having been trained by the training manager 126 using the training data 118, may generate the mask 202 of FIG. 2A. For example, the mask generator model 128 may be parameterized to assign a pixel value to each pixel of the image 113. In some implementations, areas with pixel values equal to 0, or within a defined threshold of 0, may be considered to define CTPAs, such as the CTPAs 204, 206, 208 of FIG. 2A.

A bounding box may be defined with respect to the digital image, based on the text and on the at least one candidate text placement area (306). For example, the bounding box generator 130 may be configured to execute a scoring algorithm that evaluates multiple bounding box positions with respect to the text and the CTPA(s), and assign the bounding box to the highest-scoring position. In other examples, the bounding box generator 130 may be implemented as a neural network that is trained to assign the bounding box using the training data 118.

The text may be superimposed onto the digital image within the bounding box (308). For example, upon generation of the bounding box, the bounding box generator 130 may use available image editing functionality of the application 108 to include the text within the digital image and within the bounding box.

As referenced above, and illustrated in FIG. 3, the text may be included within the bounding box with a plate that is, for example, a same size as the bounding box. A color of the plate may be determined based on a color of the text, and/or on a color(s) of the image in areas adjacent to the bounding box, or on other factors determined to result in a legible and aesthetically-pleasing rendition of the text within the digital image. Other aspects may also be predicted, such as a color of the plate, and/or a size or font type of the text.

Figure 4:
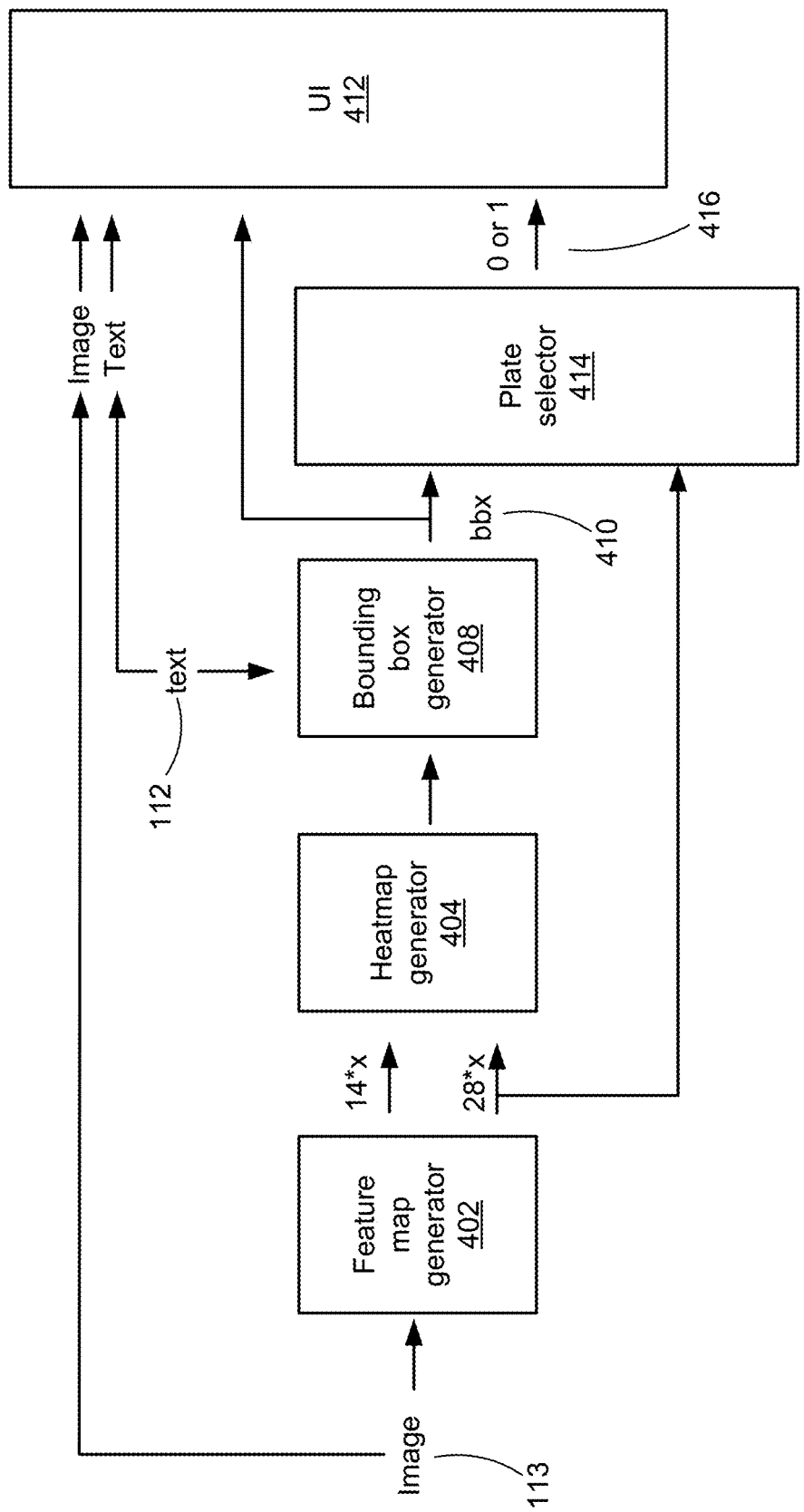
FIG. 4 illustrates a block diagram of an example implementation of the system of FIG. 1.

FIG. 4 illustrates a block diagram of an example implementation of the system of FIG. 1. In the example of FIG. 4, the image 113 is received at a feature map generator 402. For example, the feature map generator 402 may utilize, or leverage, existing and pre-trained feature map models.

For example, a feature map generally refers to representations of different output activations of trained neural network filters, which conceptually correspond to features of images being classified. The feature maps may have the same resolution as the original image, or a lower resolution.

Multiple feature maps may be used to extract lower-level and higher-level information from an image. For example, in a simplified example, feature maps may be constructed to determine circles, to determine lines, and to determine combinations of circles and lines classified as a bicycle.

The feature map generator 402 may thus be used to generate feature maps which classify many different image elements. For example, the feature map generator 402 may be based on a known CNN, such as ResNet, which refers to a Residual Neural Network trained on many different images from a known image database to classify hundreds, thousands, or more object categories.

A heatmap generator 404 may utilize outputs of the feature map generator 402 to generate a heatmap that provides examples of the types of masks described above. Put another way, the feature map generator 402 and the heatmap generator 404 may together form an example implementation of the mask generator model 128. Further example details of the operations of the feature map generator 402 and the heatmap generator 404 are provided below, with respect to FIG. 5.

In FIG. 4, the feature map generator 402 may be configured to output feature maps at multiple resolutions. For example, as shown, feature maps having dimensions of 14*x and 28*x may be generated, where the variable "x" refers to a value needed to maintain an original aspect ratio of the image 113.

In general, reducing a dimensionality of output feature maps may be computationally advantageous, because the heatmap generator 404 may not require the level of resolution provided by the feature map generator 402 in order to generate sufficiently-accurate heatmaps. In other words, using full resolution outputs of the feature map generator 402 may necessitate additional computations that do not provide appreciable (or any) advantage in generating the required heatmap.

Further, it may be useful to generate two or more feature maps, such as the 14*x and 28*x feature maps referenced and illustrated. For example, the higher dimensionality feature map (e.g., 28*x) may provide more detailed feature information, while the lower dimensionality feature map (e.g., 14*x) may provide more abstract feature information. Both types of feature maps may be useful in subsequent calculations, as described below.

The heatmap generator 404 may then proceed to assign pixel values to each pixel of the received feature maps. As described, the assigned pixel values may be between 0 and 1, depending on the probability of correctly classifying the pixel in question by the trained heatmap generator 404.

Further in FIG. 4, text 112 may be input to the bounding box generator 408. For example, in FIG. 4, the bounding box generator 408 may use a sliding window technique, in which a template bounding box corresponding in size and shape to the text 112 is constructed and spanned over an entirety of the heatmap (mask) received from the heatmap generator 404. The spanning over the heatmap may be conducted quickly and at a low computational burden, because of the relatively small dimensions of the heatmap.

As the template bounding box is spanned, the bounding box generator 408 may assign a score to each spanned position, aggregated from all pixel values of that spanned position. For example, a black pixel might contribute a value of 0 to the score, while a white pixel might contribute a value of 1. Then, a spanned position that captures only white pixels would have a high score, corresponding to a higher probability of positioning a bounding box at that location.

The template bounding box generally will have a size determined from, or corresponding to, the size of the text 112. For example, as described below with respect to FIG. 5, the training data 118 may include different sizes of bounding boxes defined and placed by the human labelers. A selected template bounding box may be taken as an average of corresponding bounding boxes from the training data 118. For example, if the text 112 includes a single word, then correspondingly-sized bounding boxes may be considered, as compared to other scenarios in which the text 112 includes a different number and formatting of words.

The template bounding box may then be determined to be slightly larger than this averaged bounding box. In some implementations, additional template bounding boxes with height/width dimensions that are slight variations from the averaged bounding box may be used during the bounding box scoring techniques described above.

A subset of bounding boxes with scores below a defined threshold score may be filtered from consideration. The remaining bounding boxes may be considered to be candidate bounding boxes, and object detection may be performed to select a bounding box to be used.

Multiple object detection techniques, or variations thereof, may be used. For example, an object detection network such as the non maximum suppression (NMS) technique may be used. The NMS technique is an object detection technique that may be modified for use by the bounding box generator 408. For example, the NMS technique detects multiple, overlapping instances of an object and then suppresses those instances that have less than the maximum probability of being a desired object. The NMS technique may be modified to detect a single bounding box from among the candidate bounding boxes.

For example, the heatmap from the heatmap generator 404 may be modified by adding negative weights to the pixels that have a low value or low probability of being include in a candidate text placement area or bounding box. For example, a negative weight may be added to any pixel value lower than about 0.2. This approach increases a likelihood that identified bounding boxes will have well-defined boundaries.

A bounding box BBX 410 output by the bounding box generator 408 may be provided both to the plate selector 414, corresponding to the plate selector 132 of FIG. 1, as well as to a UI 412. As shown, the plate selector 414 also receives the higher-dimension 28*x feature map from the feature map generator 402. As described with respect to FIG. 7, below, the plate selector 414 may be trained to consider the bounding box 410 (and associated text 112) together with the 28*x feature map, and to make a binary decision 416 as to whether a plate is needed or not.

The UI 412 receives the text 112, image 113, bounding box 410, and plate decision 416. The UI 412 therefore has all necessary information to superimpose the text 112 onto the image 113 within the bounding box 410, with or without a plate, as needed.

Figure 5:
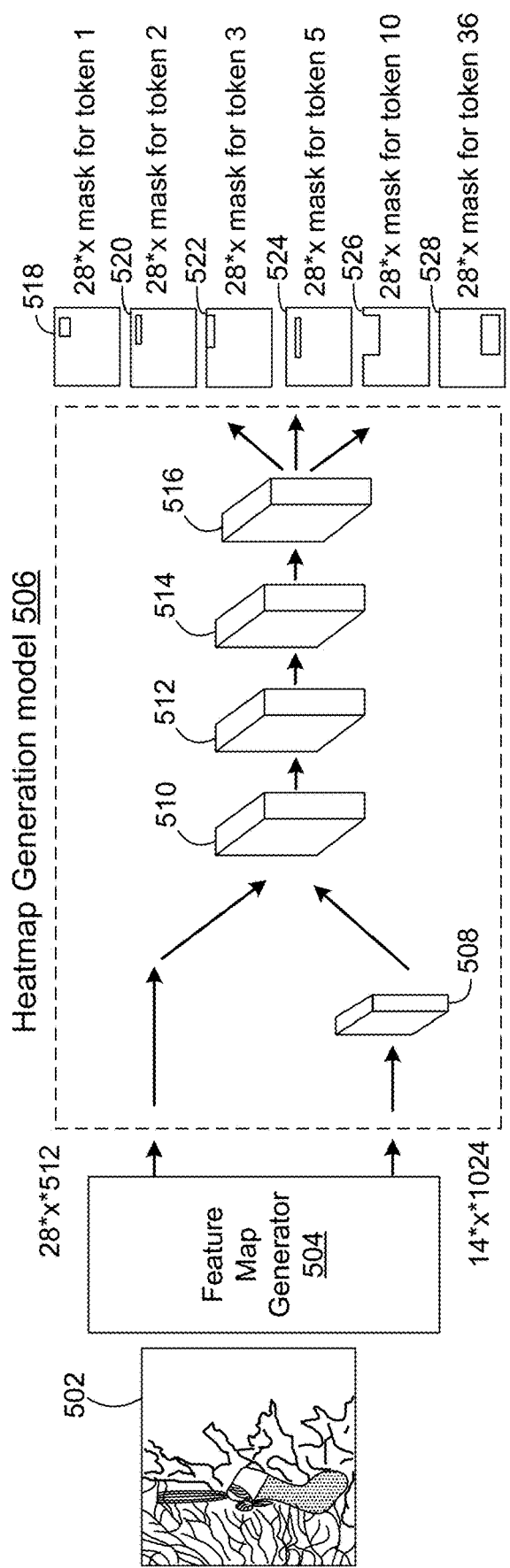
FIG. 5 is a block diagram of an example implementation of a mask generator model of FIG. 1.

FIG. 5 is a block diagram of an example implementation of a mask generator model of FIG. 1. Specifically, FIG. 5 illustrates a training process that may be executed by the training manager 126, using the training data 118.

As shown, a training image 502 is input to a feature map generator 504, corresponding to the feature map generator 402 of FIG. 4. Accordingly, the feature map generator 504 outputs 28*x*512 and 14*x*1024 feature maps, which are both input to a heatmap generation model 506 corresponding to the heatmap generator 404 of FIG. 4.

For example, the feature map generator 504 may be based on, or include, a known neural network model, such as ResNet50, and may be trained by jointly grouping a large number (e.g., millions) of stock images to 5000 categories, and images from a large image database (e.g., ImageNet) to 1000 categories. The final layers of the resulting neural network model may be omitted in order to obtain 28*x and 14*x feature maps, as described herein.

In FIG. 5, it is assumed that the training data 118 includes multiple instances of text superimposed onto the training image 502 by human labelers. In the example, the term 'token' generally refers to a size or other characteristic of the text instances. For example, 'token' may refer to a number of words within each text instance, so that 'token 1' refers to an instance with a single word of text.

As may be appreciated from the above discussion of the training data manager 116, and from FIGS. 2A-2C, different text instances having different numbers of words (and other formatting differences, such as multiple lines of text) may be inserted differently by the human labelers providing the training data 118. Consequently, in FIG. 5, the various illustrated masks 518, 520, 522, 524, 526, and 528, corresponding to various token sizes, represent example possible masks that may be predicted during training, which may then be compared to ground truth masks within the training data 118, for training purposes. Put another way, the neural network of the heatmap generation model 506 may be trained using a plurality of token sizes 518-528 corresponding to a plurality of potential text options to be processed by the neural network.

FIG. 5 illustrates that the 14*x*1024 feature map may be upsampled through a convolution layer 508 to increase its resolution and enable concatenation with the 28*x*512 feature map. Then, the concatenated feature maps may be passed through a series of convolutional layers 510, 512, 514, 516 (which may each include an appropriate number and size of filters, with layers 508-514 followed by a group normalization layer and relu activation, and layer 516 followed by sigmoid activation with an appropriate number of classes) to predict the masks 518-528. Training may proceed with an appropriate loss function selected to reduce errors over a number of training iterations.

Figure 6:
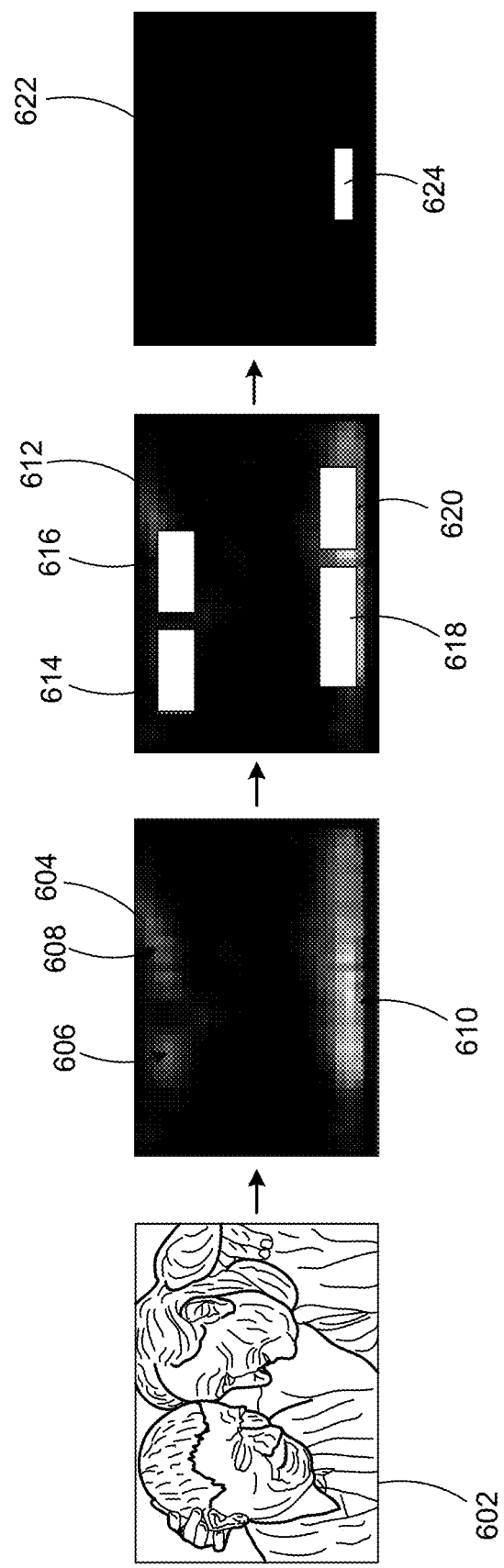
FIG. 6 illustrates an example series of image processing operations corresponding to FIG. 2A.

FIG. 6 illustrates an example series of image processing operations corresponding to FIG. 2A. In FIG. 6, an original image 602 is processed to obtain a heatmap or mask 604. It is assumed for the example that the text to be superimposed is known, and includes a single word or short phrase.

The mask 604 includes a number of candidate text placement areas 606, 608, 610, where groups of pixels exhibit relatively high values. Accordingly, the text to be inserted may be considered to obtain mask 612 with representative candidate bounding boxes 614, 616, 618, and 620, which may then be evaluated using the bounding box scoring techniques described with respect to FIG. 4. Finally in FIG. 6, a mask 622 with a selected bounding box 624 is generated, based on the determined bounding box scores.

Figure 7:
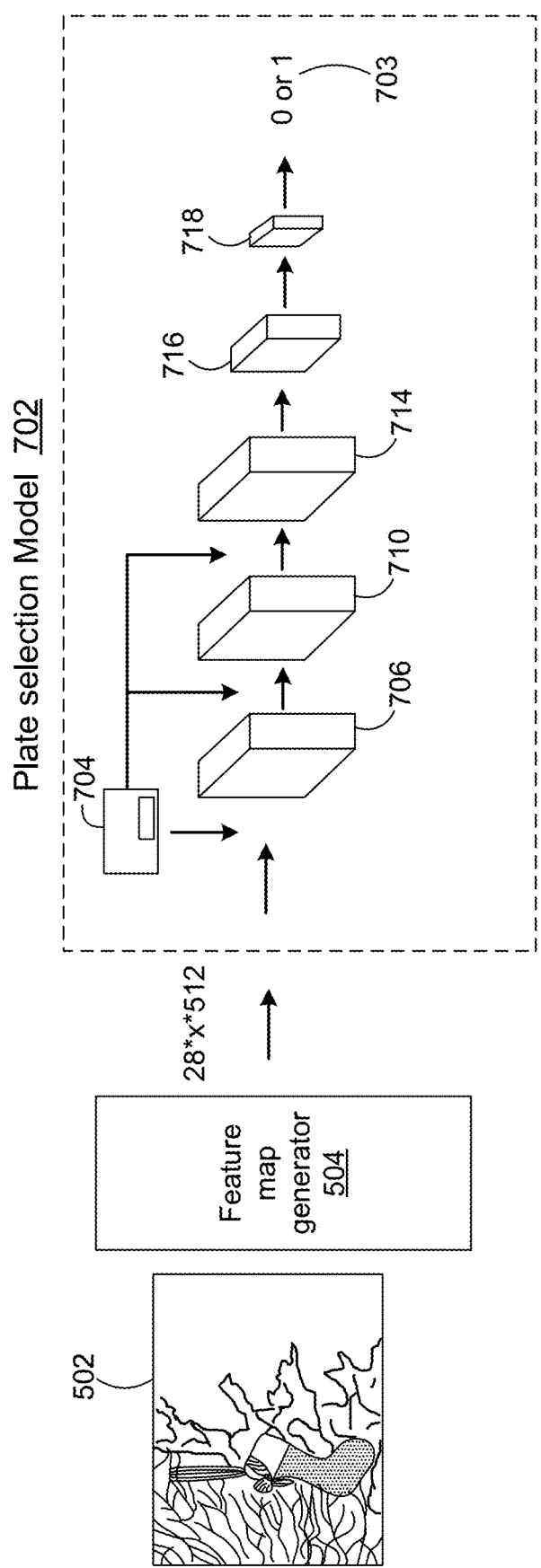
FIG. 7 is a block diagram illustrating an example implementation of a plate selector of FIG. 1.

FIG. 7 is a block diagram illustrating an example implementation of a plate selector of FIG. 1. In FIG. 7, the same training image 502 is considered in conjunction with the feature map generator 504, and consistent with the description of FIG. 4. As in FIG. 5, FIG. 7 represents the training of the plate selection model 702, using the ground truth training image 502 and a ground truth mask 704 (e.g., generated by converting bounding box coordinates to a 28*x mask).

In more detail, plate selection model 702, corresponding to the plate selector 414 of FIG. 4, may utilize the 28*x*512 feature map from the feature map generator 504 to obtain a plate selection decision 703.

As shown, the 28*x*512 feature map is concatenated with mask 704, as referenced in the illustration of FIG. 4 with respect to bounding box 410. The concatenated result may be passed to convolutional network 706. The output of the convolutional network 706 is concatenated again with the mask 704, and input to convolutional network 710. The output of the convolutional network 710 is concatenated again with the mask 704, and input to convolutional network 714. By these multiple concatenations, the system of FIG. 7 ensures that the information of the mask 704 is retained throughout the training process.

Similarly to FIG. 5, layers 706, 710, 714, 716, 718 may represent convolution layers with selected numbers and sizes of filters, each followed by group normalization and relu activation layers. The layers 714, 716, 718 also may include a pooling layer (e.g., max pooling layer) for a desired decrease(s) in resolution.

Thus, a dimension of each output of the convolutional networks 706, 710, 714 is lowered until the output is the single dimension output 703, represented as 0 or 1. In this context, 0 refers to a determination that no plate is needed, while a value of 1 represents a need for a plate to be included.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied in a non-transitory computer-readable storage medium and comprising instructions that, when executed by at least one computing device, are configured to cause the at least one computing device to:
   receive a digital image and an input text;
   generate a heatmap for the digital image using a neural network trained to identify candidate text placement areas within images based on training data that includes training images and training text superimposed on the training images, the heatmap including pixel values assigned to pixels of the digital image, wherein each pixel value corresponds to a probability of inclusion of at least one candidate text placement area, and wherein the heatmap is generated independently of the input text;
   position a template bounding box at a plurality of locations of the digital image to produce a plurality of candidate bounding boxes based on the heatmap using a sliding window technique, wherein the template bounding box is based on a size or a shape of the input text;
   assign a score for each candidate bounding box of the plurality of candidate bounding boxes based on the pixel values of the heatmap located within each of the plurality of candidate bounding boxes;
   select a bounding box for the input text from the plurality of candidate bounding boxes based the score; and
   superimpose the input text onto the digital image by placing the input text within the bounding box.

2. The computer program product of claim 1, wherein the instructions, when executed, are further configured to cause the at least one computing device to:
   include a contrast plate with the input text within the bounding box.

3. The computer program product of claim 1, wherein the instructions, when executed, are further configured to cause the at least one computing device to:
   position the template bounding box including spanning the template bounding box over the heatmap as a sliding window.

4. The computer program product of claim 1, wherein the instructions, when executed, are further configured to cause the at least one computing device to:
   generate the heatmap including identifying the at least one candidate text placement area as corresponding to heuristics defining image locations preferred for text inclusion.

5. The computer program product of claim 1, wherein the instructions, when executed, are further configured to cause the at least one computing device to:
   define a size and dimensions of the template bounding box based on content and formatting of the input text.

6. The computer program product of claim 1, wherein the instructions, when executed, are further configured to cause the at least one computing device to:

add a negative weight to the pixel values having a low probability of being included in a candidate text placement area, prior to the positioning of the template bounding box.

7. The computer program product of claim 1, wherein the instructions, when executed, are further configured to cause the at least one computing device to:

remove a subset of the candidate bounding boxes having a score below a threshold score; and of remaining candidate bounding boxes, execute an object detection algorithm to select the bounding box therefrom.

8. The computer program product of claim 1, wherein the instructions, when executed, are further configured to cause the at least one computing device to:

train the neural network using a plurality of token sizes corresponding to a plurality of potential text options to be processed by the neural network.

9. The computer program product of claim 1, wherein the digital image is received as a result of an image search executed against image data.

10. A computer-implemented method, the method comprising:

receiving a digital image and input text;

generating a heatmap for the digital image using a neural network trained to identify candidate text placement areas within images, the heatmap including pixel values assigned to pixels of the digital image, wherein the heatmap is generated independently of the input text;

positioning a template bounding box at a plurality of locations of the digital image to produce a plurality of candidate bounding boxes based on the heatmap using a sliding window technique, wherein the template bounding box is based on a size or a shape of the input text;

assigning a score for each candidate bounding box of the plurality of candidate bounding boxes based on the pixel values of the heatmap located within each of the plurality of candidate bounding boxes;

selecting a bounding box for the input text from the plurality of candidate bounding boxes based the score; and superimposing the input text onto the digital image by placing the input text within the bounding box.

11. The method of claim 10, further comprising:

including a contrast plate with the input text within the bounding box.

12. The method of claim 10, wherein generating the heatmap further comprises:

assigning values to pixels of the digital image, the values corresponding to a probability of inclusion of the at least one candidate text placement area.

13. The method of claim 10, wherein generating the heatmap further comprises:

identifying the at least one candidate text placement area as corresponding to heuristics defining image locations preferred for text inclusion.

14. The method of claim 10, wherein defining the bounding box further comprises:

defining a size and dimensions of the bounding box based on content and formatting of the input text.

15. The method of claim 10, wherein defining the bounding box further comprises:

identifying candidate bounding boxes using a template bounding box that correspond to the text; and assigning a score to each candidate bounding box of the candidate bounding boxes, based on pixel values of the heatmap within each candidate bounding box.

16. The method of claim 15, wherein defining the bounding box further comprises:

removing a subset of the candidate bounding boxes having a score below a threshold score; and of remaining candidate bounding boxes, executing an object detection network to select the bounding box therefrom.

17. The method of claim 10, further comprising:

training the neural network using a plurality of token sizes corresponding to a plurality of potential text options to be processed by the neural network.

18. A system comprising:

at least one memory including instructions; and at least one processor that is operably coupled to the at least one memory and that is arranged and configured to execute instructions that, when executed, cause the at least one processor to receive a digital image and input text;

process the digital image and input text with a neural network trained using training data that includes training images and training text superimposed on the training images based on text placement heuristics, to thereby obtain a heatmap for the digital image, wherein the heatmap is generated independently of the input text;

define a bounding box, based on the heatmap; and superimpose the input text onto the digital image and by placing the text within the bounding box.

19. The system of claim 18, wherein the system is further configured to:

include a contrast plate with the input text within the bounding box.

20. The system of claim 18, wherein the system is further configured to:

define a size and dimensions of the bounding box based on content and formatting of the input text.

* * * * *